US011048637B2

(12) United States Patent
Sundaram

(10) Patent No.: US 11,048,637 B2
(45) Date of Patent: Jun. 29, 2021

(54) HIGH-FREQUENCY AND LOW-POWER L1 CACHE AND ASSOCIATED ACCESS TECHNIQUE

(71) Applicant: Samsung Electronics Co., Ltd., Suwon-si (KR)

(72) Inventor: Karthik Sundaram, Austin, TX (US)

(73) Assignee: SAMSUNG ELECTRONICS CO., LTD.

( * ) Notice: Subject to any disclaimer, the term of this patent is extended or adjusted under 35 U.S.C. 154(b) by 131 days.

(21) Appl. No.: 16/547,557

(22) Filed: Aug. 21, 2019

(65) Prior Publication Data
US 2020/0401524 A1 Dec. 24, 2020

Related U.S. Application Data

(60) Provisional application No. 62/863,238, filed on Jun. 18, 2019.

(51) Int. Cl.
G06F 12/0864 (2016.01)
G06F 12/1027 (2016.01)
G06F 9/30 (2018.01)

(52) U.S. Cl.
CPC ...... *G06F 12/0864* (2013.01); *G06F 9/30043* (2013.01); *G06F 12/1027* (2013.01); *G06F 2212/1024* (2013.01); *G06F 2212/1028* (2013.01); *G06F 2212/6032* (2013.04)

(58) Field of Classification Search
CPC .................................................. G06F 12/0864
USPC ....................................................... 711/118
See application file for complete search history.

(56) References Cited

U.S. PATENT DOCUMENTS

| | | | | |
|---|---|---|---|---|
| 5,835,928 A | * | 11/1998 | Auslander | G06F 12/0864 711/3 |
| 6,202,127 B1 | * | 3/2001 | Dean | G06F 11/3466 711/117 |
| 2012/0173825 A1 | * | 7/2012 | Ehrlich | G06F 11/362 711/145 |
| 2018/0137056 A1 | | 5/2018 | Bean | |

FOREIGN PATENT DOCUMENTS

WO          2015057846 A1    4/2015

OTHER PUBLICATIONS

Alves, Marco A. Z. et al., "Energy Savings via Dead Sub-Block Prediction", 2012 IEEE 24th International Symposium on Computer Architecture and High Performance Computing, pp. 51-58.

* cited by examiner

*Primary Examiner* — Jae U Yu
(74) *Attorney, Agent, or Firm* — Renaissance IP Law Group LLP

(57) ABSTRACT

A high-frequency and low-power L1 cache and associated access technique. The method may include inspecting a virtual address of an L1 data cache load instruction, and indexing into a row and a column of a way predictor table using metadata and a virtual address associated with the load instruction. The method may include matching information stored at the row and the column of the way predictor table to a location of a cache line. The method may include predicting the location of the cache line within the L1 data cache based on the information match. A hierarchy of way predictor tables may be used, with higher level way predictor tables refreshing smaller lower level way predictor tables. The way predictor tables may be trained to make better predictions over time. Only selected circuit macros need to be enabled based on the predictions, thereby saving power.

17 Claims, 9 Drawing Sheets

HIGH-FREQUENCY AND LOW-POWER L1 CACHE AND ASSOCIATED ACCESS TECHNIQUE

BACKGROUND

The present inventive concepts relate to semiconductor circuits, and more particularly, to a high-frequency and low-power L1 cache and associated access technique using one or more way tables.

Central processing units (CPUs) are used in computers such as personal computers, smart phones, tablets, and the like. A CPU accesses different levels of memory structures commonly known as caches. The different levels can include, for example, a level 1 (L1) cache that is typically situated closest to the CPU, and a level 2 (L2) cache that is typically situated adjacent the L1 cache. The L1 and L2 caches are usually comprised of static random access memory (SRAM) devices. The CPU may also access main memory, which is typically separated from the CPU by a system bus, and is usually comprised of dynamic random access memory (DRAM) or non-volatile memory such as flash memory. Additional caches may be used, such as a level 3 (L3) cache. The caches may be arranged in a hierarchy with multiple levels often called L1, L2, and L3 caches.

A memory load instruction (Ld) is a relatively common instruction used in a CPU. The primary purpose of this instruction is to read data from a location in memory. For faster processing of data, the CPU accesses the faster and smaller cache memories (e.g., L1 and L2), which are physically resident closer to the CPU. The caches store the most frequently accessed pieces of data and are often organized as instruction and data caches.

In order to achieve higher CPU performance, load operations need fast access to the data from the L1 data cache. As a result, the latency for reading data from the L1 data cache is a critical performance metric for the CPU. In addition, multiple memory operations might contend to access the L1 data cache at the same time. Cache access in general can affect both the dynamic power as well as the clock frequency constraints under which the CPU can operate.

BRIEF SUMMARY

Some embodiments include a high-frequency and low-power L1 data cache and associated access technique. The access technique may include a method for inspecting a virtual address of an L1 data cache load instruction, and indexing into a row and a column of a way predictor table using metadata and the virtual address. The method may include matching information stored at the row and the column of the way predictor table to a location of a cache line. The method may include predicting the location of the cache line within the L1 data cache based on the information match. A hierarchy of way predictor tables may be used, with higher level way predictor tables refreshing smaller lower level way predictor tables. The way predictor tables may be trained to make better predictions over time. Only selected circuit macros need to be enabled based on the predictions, thereby saving power.

Certain of the inventive features may be best achieved by implementing them within an L1 cache of a processor such as within an ARM or X86 processor core. Other types of processors or application specific integrated circuits (ASICs) can implement the inventive principles disclosed herein. The inventive concepts may be implemented within processors and/or memory modules of a variety of mobile devices such as smart phones, tablets, notebook computers, or the like, or in a variety of stationary devices such as desktop computers, routers, or the like.

BRIEF DESCRIPTION OF THE DRAWINGS

The foregoing and additional features and advantages of the present inventive principles will become more readily apparent from the following detailed description, made with reference to the accompanying figures, in which.

DETAILED DESCRIPTION

Figure 1:
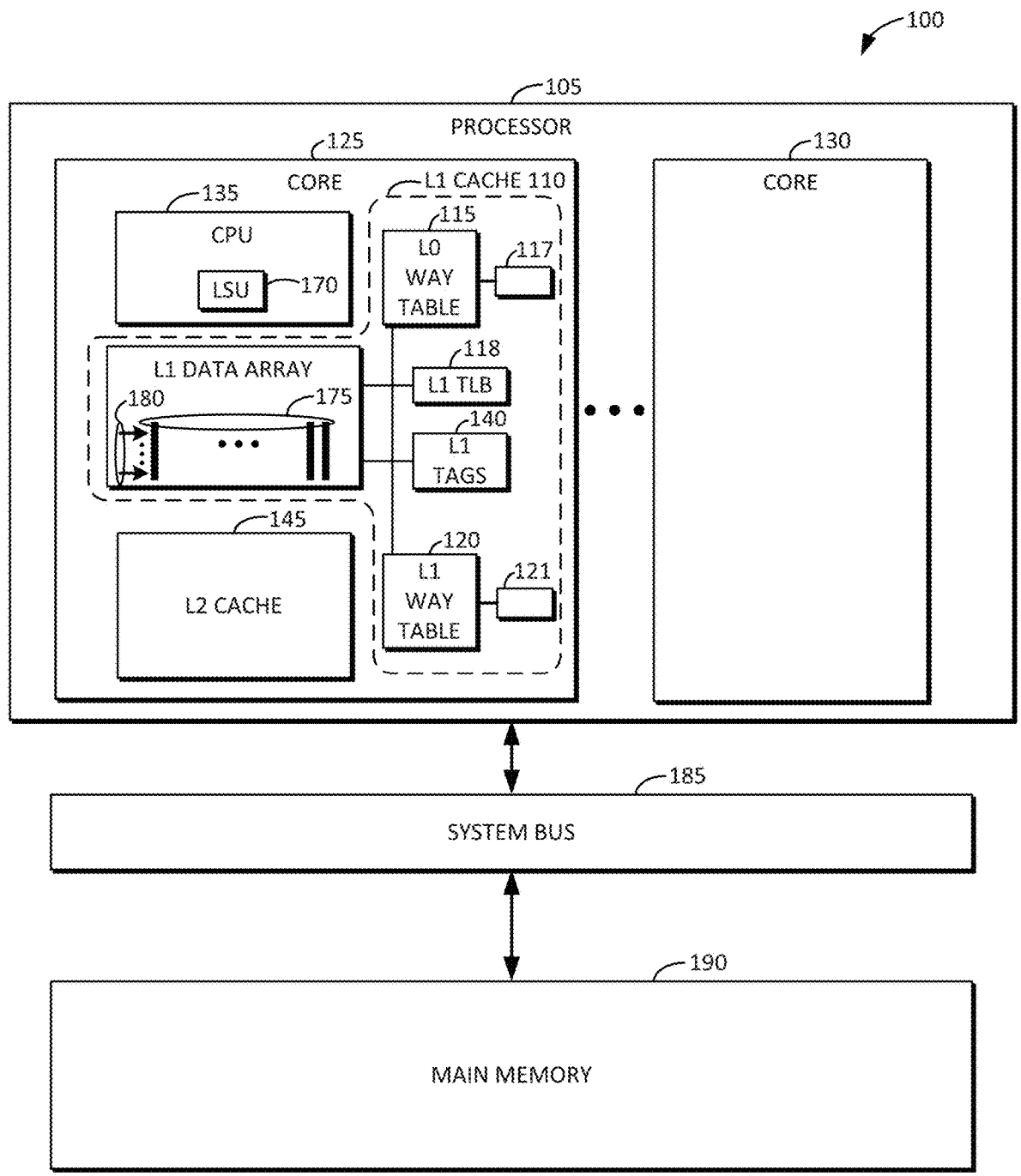
FIG. 1 is an example block diagram of a computer system including a processor, an L1 cache, and one or more way tables in accordance with some embodiments disclosed herein.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first cache could be termed a second cache, and, similarly, a second cache could be termed a first cache, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Embodiments disclosed herein include an improved L1 cache and associated access technique. Setting up address and other required control state before accessing the L1 cache takes a finite amount of time. Reducing this delay is a challenge and can affect a maximum clock frequency at which a CPU can operate. The disclosed L1 cache and associated access technique reduces this delay and therefore increases the maximum clock frequency at which the CPU can operate. Another challenge is that data in a cache is often stored using circuit elements, also called circuit macros. There is a finite power draw associated with reading these circuit elements. Reducing this power is beneficial for the CPU operation, and the disclosed L1 cache and associated access technique reduces this power draw. For a high performance CPU it is important that the L1 data cache can sustain multiple read operations in a cycle. This can cause scenarios where multiple memory operations are trying to access the same circuit macro. Embodiments disclosed herein mitigate the performance impact caused by such memory contention issues.

FIG. 1 is an example block diagram of a computer system 100 including a processor 105, an L1 cache 110, and one or more way tables (e.g., L0 way table 115 and L1 way table 120) in accordance with some embodiments disclosed herein. The L0 way table 115 may have control logic 117 associated therewith, as further described below. Similarly, the L1 way table 120 may have control logic 121 associated therewith, as further described below. The processor 105 may include multiple processor cores (e.g., 125 and 130). Each processor core may include a central processing unit (e.g., CPU 135). Each processor core may also include an L1 cache (e.g., 110) Each processor core may further include an L2 cache (e.g., 145). It will be understood that each processor core may include additional caches such as an L3 cache (not shown). Each processor core may further include an L0 way table (e.g., 115), described in detail below. Each processor core may further include an L1 way table (e.g., 120), described in detail below. Each CPU may include a load-store unit (LSU) such as LSU 170. The L1 cache 110 may include multiple banks (e.g., 175) and ways (e.g., 180). A memory bank includes multiple rows and columns of memory storage units. A piece of data may be cached in the L1 cache 110 having a location that is defined by the (bank, way). Accordingly, the L1 data cache 110 includes multiple banks 175 and multiple ways 180. Each processor core may further include a translation lookaside buffer (TLB) (e.g., L1 TLB 118). The TLB 118 stores translations of virtual memory to physical memory. Each processor core may further include cache tags (e.g., 140). The cache tags 140 allow the L1 cache 110 to translate from an address to a unique cache location.

The processor 105 may be communicatively coupled to a main memory 190 via a system bus 185. A cache hit means that the CPU 135 tried to access an address, and a matching cache entry was available in the L1 cache 110. A cache miss means that the CPU tried to access the address, and there is no matching cache entry in the L1 cache 110. In this case, either the L2 cache 145 and/or the main system memory 190 is accessed for the requested data.

The LSU 170 of the CPU 135 is responsible for the handling read operations to the L1 data cache 110. The LSU 170 initiates the read operations by executing one or more load "Ld" instructions. Some embodiments disclosed herein rely on spatial locality of memory references to optimize the read operations associated with the L1 data cache 110. The LSU 170 may monitor data addresses provided by the load instructions. CPU designs tend to accelerate memory load instructions by caching the most frequently used chunks of data closer to the LSU 170 in the L1 data cache 110. These frequently referenced pieces of data are referred to herein as cache lines. The L1 data cache 110 may be searched using the monitored data addresses to check if the L1 data cache 110 contains a cache line of data needed by the load instruction. The result of this search including the location of the cache line within the L1 data cache 110 is opportunistically stashed in a side structure that is referred to herein as a way predictor table (e.g., L0 way table 115 and L1 way table 120). In order to read the cache lines, the locations of the cache lines may be mapped to an address of data requested by a load instruction. This is accomplished by tagging the locations with an address, and may be accomplished using the cache tags 140.

An address provided by the load instruction is often a virtual address, and is in a different form than that recognized by the rest of the memory subsystem. Memory subsystems including the L1 data cache 110 translate virtual addresses to physical addresses. This is done using the TLB 118. A typical read of the L1 data cache 110 (i.e., without using the way predictor tables) would otherwise require a few pre-compute steps. This includes using the TLB 118 to translate the virtual address provided by the load instruction, and then using the cache tags 140 to index into the L1 data cache 110. A serial approach like this might sometimes take more than a single clock cycle, and if done in a single clock cycle can account for a significant portion of the clock period. Embodiments disclosed herein using the way predictor tables describe a different technique to reading the data from the L1 data cache 110.

The way predictor tables (e.g., L0 way table 115 and L1 way table 120) are built to be area and power efficient, and to allow for fast searches. In addition, the way predictor tables are built to take advantage of the spatial locality of data accesses to the L1 data cache 110. Key events in the LSU 170 such as evictions, snoops, TLB replacements, data prefetches, or the like, may be monitored and used to train the way predictor tables. As the way predictor tables are trained over time, this allows the fast searches in the way predictor tables to be more accurate.

The way predictor tables (e.g., L0 way table 115 and L1 way table 120) may be organized in a hierarchical fashion. The lower level (e.g., L0 way table) may be used to predict a location of cache lines associated with a smaller set of addresses. This speeds up the search function and keeps the area cost low, which is useful in reducing the cache access latency. The higher level table (e.g., L1 way table 120) may encompass a larger set of addresses and is used to periodically refresh the contents of the lower level table (e.g., L0 way table 115). It will be understood that two or more way predictor tables may be used in this hierarchical fashion. Addresses generated by a hardware prefetcher of the CPU 135 may be leveraged to train the way predictor tables (e.g., L0 way table 115 and L1 way table 120) and learn the locations of cache lines well ahead of the actual load instruction. Accordingly, a two-level hierarchy improves coverage and reduces pressure on timing paths, while predictions to enable cache reads and reduce cache conflicts are performed using the L0 way table 115, thereby allowing faster access to the L1 data cache 110.

Accelerated and accurate search operations in the way predictor tables (e.g., L0 way table 115 and L1 way table 120) allow the CPU 135 to fire only the needed circuit macros, which allows for substantial power savings. The term "fire" as used herein refers to enabling the circuit macros of the L1 data cache 110 so that data content of the circuit macros can be read out. Locations of data in the cache learned by the way predictor tables may also be used to accurately check if multiple read accesses in the same clock cycle are trying to access the same circuit macros. Further corrective actions may be taken in such cases, which reduces the performance impact of such conflict scenarios.

Embodiments disclosed herein allow for enhanced conflict checking on the L1 data cache 110 by using the predicted cache line locations in one or more of the way predictor tables (e.g., L0 way table 115 and L1 way table 120). Embodiments disclosed herein allow cache tags (e.g., 140) and the TLB (e.g., 118) to be looked up in parallel, which may be used for training the way predictor tables and checking the accuracy of predictions.

In conventional approaches, the cache tags 140 and often the TLB 118 have to be read to be able to enable circuit macros of the L1 data cache 110. Such an approach may present significant challenges for physical implementation and aggressive frequency targets. Another conventional approach enables all of the cache circuit macros for every memory read, which is expensive from a power standpoint. By predicting the locations of the cache lines, embodiments disclosed herein avoid the pitfalls of traditional techniques. Moreover, by allowing for simultaneous look up of the cache tags 140 and the L1 TLB 118, the way predictor tables (e.g., L0 way table 115 and L1 way table 120) may be better trained, and the accuracy of prediction may be better validated. This avoids other costly replay mechanisms such as flushing an entire pipeline of the CPU 135, or sending spurious memory read requests to downstream levels of the cache hierarchy (e.g., L2 cache 145). In addition, cache line location prediction allows better conflict resolution for multiple reads to the L1 data cache 110. Using the prediction information allows the L1 data cache 110 to only flag cache contention issues when required, and mitigates the performance impact introduced by retrying cache-conflicting memory read operations.

The circuit macros of the L1 data cache 110 may be read without needing to do a read of the L1 TLB 118, and without needing to do a search of generated physical addresses in the L1 tags 140. The way predictor tables (e.g., L0 way table 115 and L1 way table 120) exploit the locality of cache references by storing frequently referenced cache locations (e.g., index, way of the lines in the cache). The way predictor tables are organized in such a way so as to be able to reduce logic depth on signals used to fire the circuit macros. Reduction in logic depth allows timing of critical signals to shut off both row and column decoders of the L1 data cache 110, thereby resulting in power savings. Cache line locations (e.g., index, way) learned by the way predictor tables may be used to more accurately check whether there are multiple accesses to the same circuit macro. For example, accesses to the same bank 175 will only be required to conflict if they are to the same bank 175 and the same way 180, thereby resulting in performance improvement.

The separate way predictor tables (e.g., L0 way table 115 and L1 way table 120) may maintain metadata used for prediction. The L0 way table 115 is a relatively smaller predictor structure, while the L1 way table 120 is a secondary, relatively larger predictor structure, which allows the L1 way table 120 to be used to predict the way 180 for a larger set of cache lines. The L1 way table 120 may also speculatively prefetch useful content into the L0 way table 115. A pin on the circuit macro may enable the read of the circuit macro. Not enabling a circuit macro if it is not required to provide data has significant power savings associated with it. Embodiments disclosed herein include a mechanism and accompanying logic to train the L0 way table 115 and the L1 way table 120, and refresh the L0 way table 115 with prediction metadata from the L1 way table 120. Embodiments disclosed herein include control logic to detect cache contention issues and arbitrate between the read operations.

Figure 2:
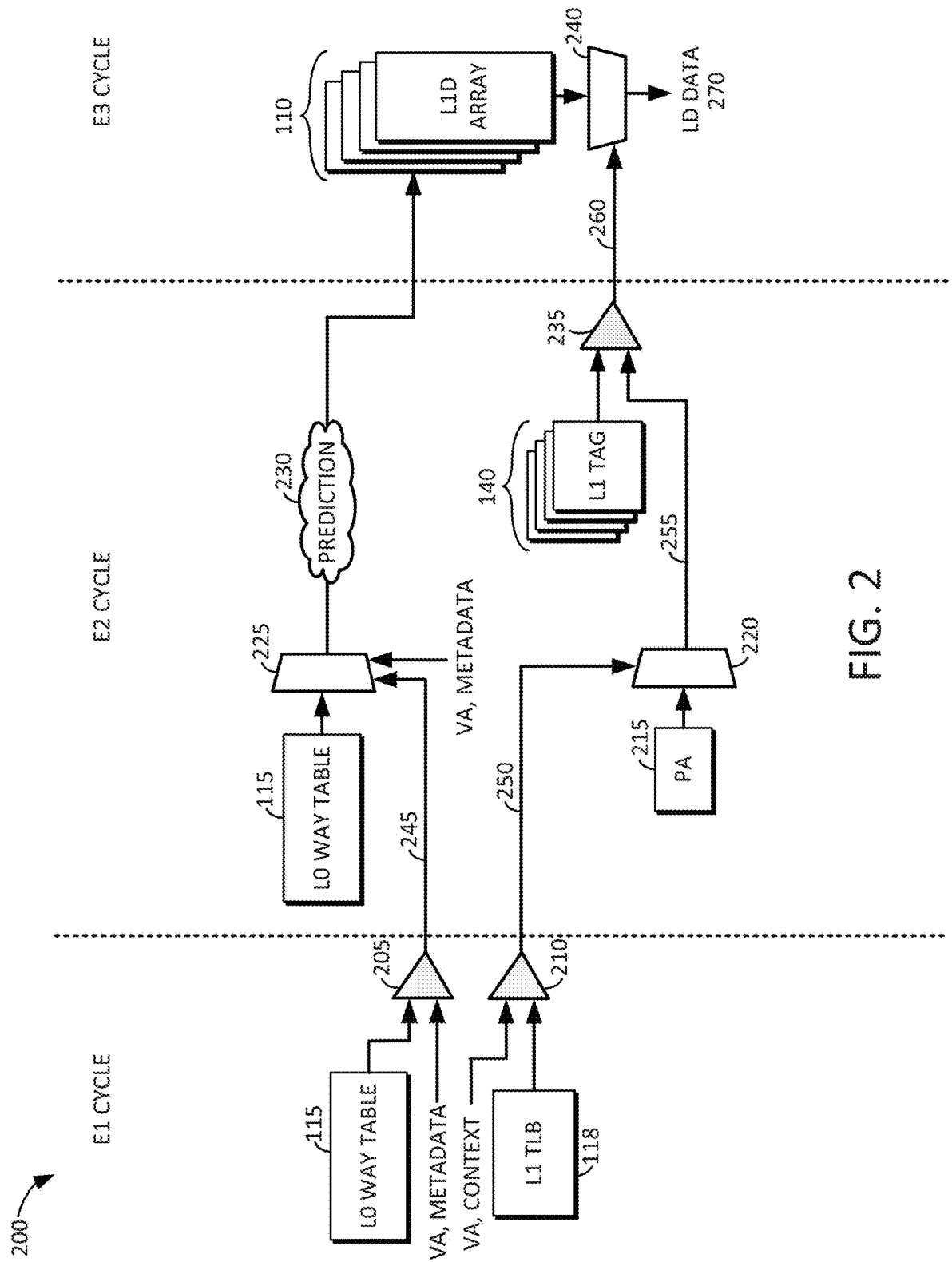
FIG. 2 is an example block and flow diagram of an L1 cache access technique in accordance with some embodiments disclosed herein.

FIG. 2 is an example block and flow diagram 200 of an L1 cache access technique in accordance with some embodiments disclosed herein. The flow is divided into three clock cycles E1, E2, and E3. In the first clock cycle E1, information from the L0 way table 115 is compared by a comparator 205 with incoming metadata and virtual address, which generates a control signal 245. In some embodiments, the comparator 205 is a 4:1 comparator or otherwise performs a 4:1 compare operation. In addition, information from the L1 TLB 118 is compared by a comparator 210 with the virtual address and the associated context, which may generate a control signal 250. In some embodiments, the comparator 210 is a 32:1 comparator or otherwise performs a 32:1 compare.

In the second clock cycle E2, information from the L0 way table 115 is selected by the selector 225. In some embodiments, the selector 225 is a multiplexor. In some embodiments, the selector 225 is a 32:1 multiplexor. The selector 225 may be controlled by the control signal 245. In some embodiments, bits 11 through 7 (i.e., [11:7]) of the virtual address (i.e., VA[11:7]) may be used in the control of the selector 225. The selector 225 may output a prediction 230, which is transmitted to an L1 data array of the L1 data cache 110. The prediction 230 may include cache hit prediction and way prediction information. Meanwhile, information from the physical address (PA) unit 215 is selected by the selector 220. In some embodiments, the selector 220 is a multiplexor. In some embodiments, the selector 220 is a 32:1 multiplexor. The selector 220 may be controlled by the control signal 250. The selector 220 may output a physical address 255, which is transmitted to a comparator 235. The comparator 235 may compare the physical address 255 with information from the L1 data tags 140, which may generate a control signal 260. In some embodiments, the comparator 235 is a 4:1 comparator or otherwise performs a 4:1 compare operation.

In the third clock cycle E3, information from the L1 data cache 110 is selected by the selector 240. In some embodiments, the selector 240 is a multiplexor. In some embodiments, the selector 240 is a 4:1 multiplexor. The selector 240 may be controlled by the control signal 260. The selector 240 may output load data 270. The load data 270 is data that is read out of the L1 data cache 110.

Figure 3:
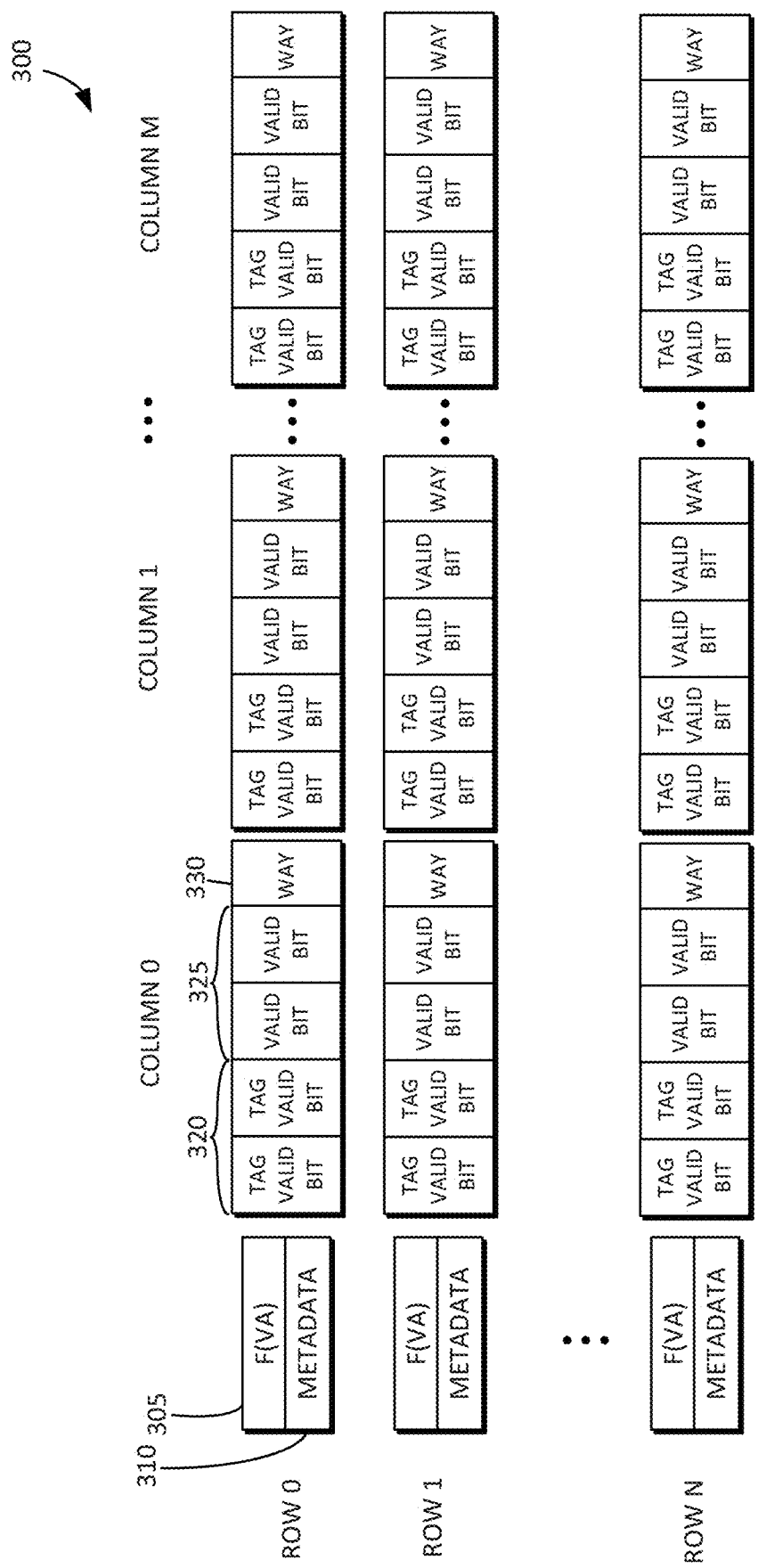
FIG. 3 is an example block diagram of a way predictor table in accordance with some embodiments disclosed herein.

FIG. 3 is an example block diagram of a way predictor table 300 in accordance with some embodiments disclosed herein. The way predictor table 300 represents either the L0 way table 115 or the L1 way table 120, or both. The way predictor table 300 is organized into rows (e.g., row 0 through N) and columns (e.g., column 0 through M). With respect to the L0 way table 115, the number of rows N may be 4. With respect to the L1 way table 120, the number of rows N may be 12. In both of the L0 way table 115 and the L1 way table 120, the number of columns M may be 32. In a preferred embodiment, the columns may be indexed using a combination of virtual address bits and/or other metadata. In some embodiments, for example, the columns may be indexed using at least virtual address bits 11 through 7 (i.e., [11:7]) of the virtual address (i.e., VA[11:7]) and/or metadata (e.g., 320, 325, 330). In some embodiments, each of the rows may include virtual address bits 305 and metadata 310. The virtual address bits 305 may be any suitable range or number of bits associated within the virtual address. For example, the virtual address bits 305 may be a function F of the virtual address (e.g., F(VA)). It will be understood that that any suitable number of bits of the virtual address may be used, or some other suitable arithmetic function of the virtual address bits may be used. Each row in the way predictor table 300 may store locations of a group of neighboring cache lines. Accordingly, a method is disclosed herein to associate the virtual address of a load instruction with the location of its corresponding data in the cache.

Each of the columns (e.g., column 0 through M) may store metadata including one or more tag valid bits 320, one or more valid bits 325, and one or more way values 330. In some embodiments, the valid and way bits might refer to adjoining cache lines. The tag valid bits 320 may indicate whether there has been at least one reference to a corresponding cache line. If the tag valid bits 320 are not set, then no way prediction is made, and all ways are fired. The valid bits 325 indicate whether the corresponding cache lines are resident in the L1 cache 110 or not. If a valid bit 325 is set, then a cache hit is predicted for the associated cache line. The metadata (e.g., 320, 325, 330) including some combination of virtual address bits such as VA[11:7] may be used to not only index the column into the way predictor table 300, but may also be used to read out the way 330 associated with a cache line.

Way Predictor Table Training

Figure 4:
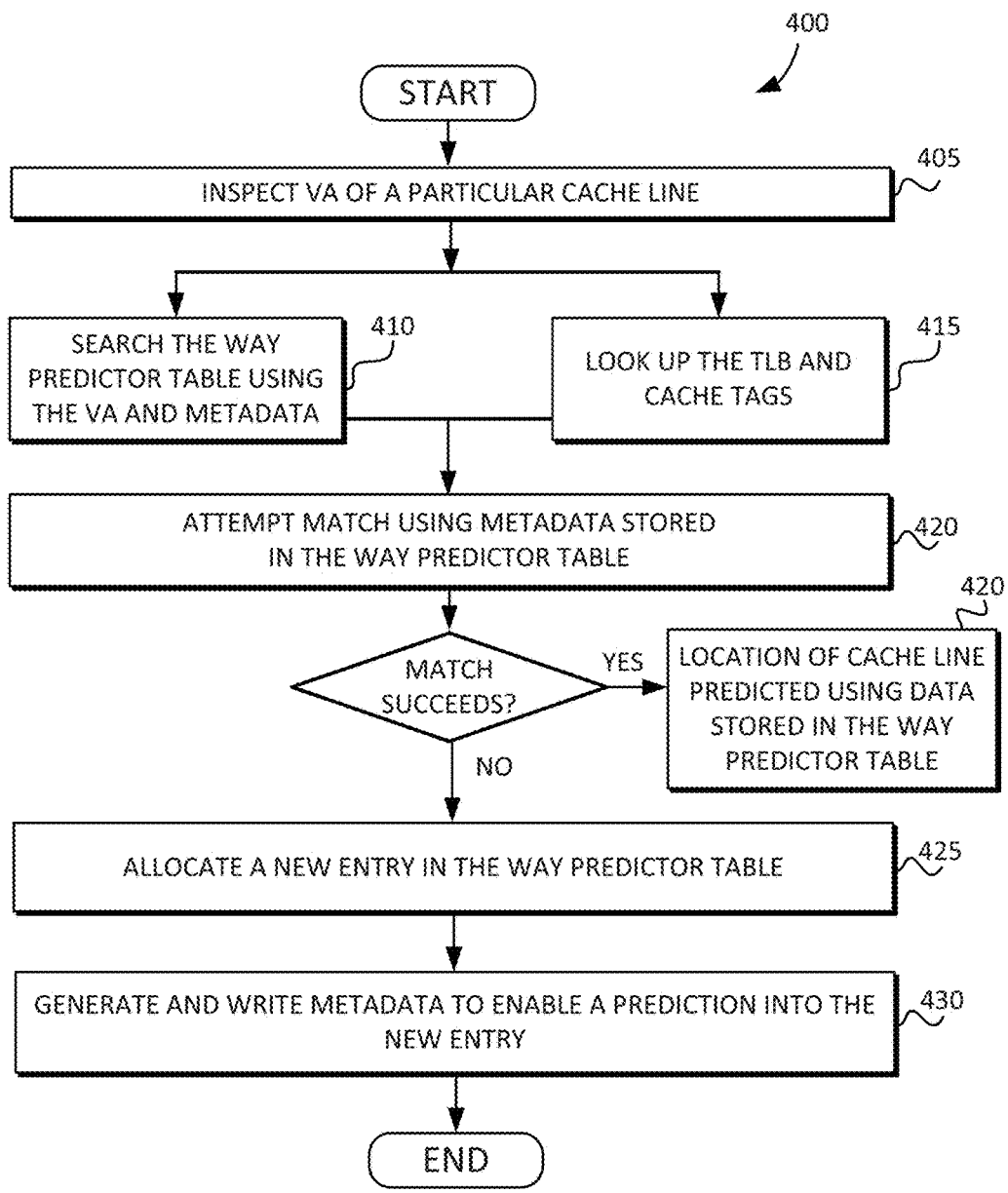
FIG. 4 is a flow diagram illustrating a technique for training a way predictor table in accordance with some embodiments disclosed herein.

FIG. 4 is a flow diagram illustrating a technique for training a way predictor table in accordance with some embodiments disclosed herein. Reference is now made to FIGS. 1 through 4.

As load instructions flow through the LSU 170 of the CPU 135, the virtual address for a particular cache line data requested by the load instruction is inspected at 405. At 410, metadata and virtual address associated with the load is used to search the L0 way table 115 and/or the L1 way table 120. In parallel at 415, the virtual address is also used to look up the TLB 118 and generate a physical address, which is then used to lookup the cache tags 140. It is inferred that the cache tags 140 accurately track the location of a cache line of data in the L1 data cache 110.

At 420, a match is attempted using metadata stored in one or more of the way predictor tables (e.g., L0 way table 115 and/or the L1 way table 120). If the match succeeds then at 420 the location of the cache-line is predicted using data stored in the way predictor table. If a discrepancy is noted between this prediction and the one provided by the cache tags 140, then an attempt is made at correcting the way predictor tables to reflect this new baseline.

If no match is found, then at 425 control logic (e.g., 117 of FIG. 1) allocates a new entry in the way predictor table. At 430, metadata to enable a prediction for this address may be generated on the fly and written into the newly allocated entry.

The control logic 117 may also monitor any events which could affect the state of the line in the cache. For example, it is possible that some load instructions require data to be brought into the L1 data cache 110 from further down in the cache hierarchy (e.g., such as from L2, L3, and main memory). Installation of this new data into the L1 data cache 110 can cause an existing cache line of data to be evicted. This change may be reflected in one or more of the way predictor tables as an update to the metadata associated with the evicted cache line and the newly brought in cache line.

The way predictor tables may be trained using cache line fills. Load-store miss-buffer on initiating a line fill into the L1 data cache 110 may update the L0 way table 115 with the way information. Metadata associated with the line fill may be used to scan the L0 way table 115 and index into an appropriate row. Metadata may be chosen appropriately to reduce the power associated with the scan operation.

Embodiments disclosed herein can cleanup the way tables on snoops, invalidates associated with the TLB 118, and replacements associated with the TLB 118. On invalidating snoops, the corresponding way in the L0 way table 115 is marked as invalid. As a result accesses to these cache lines do not fire the corresponding circuit macros in the L1 data cache 110. TLB shootdown associated with the TLB 118 may be handled indirectly. In order to save area, the shootdown may use existing hardware used in the L1 TLB 118. Each cache line tracked in the L0 way table may be associated with an entry number from the L1 TLB 118. If the associated entry in the L1 TLB 118 is lost due to a shootdown or replacement, then the cache line in the L0 way table 115 may be marked as invalid.

Prediction and Cache Read

Figure 5:
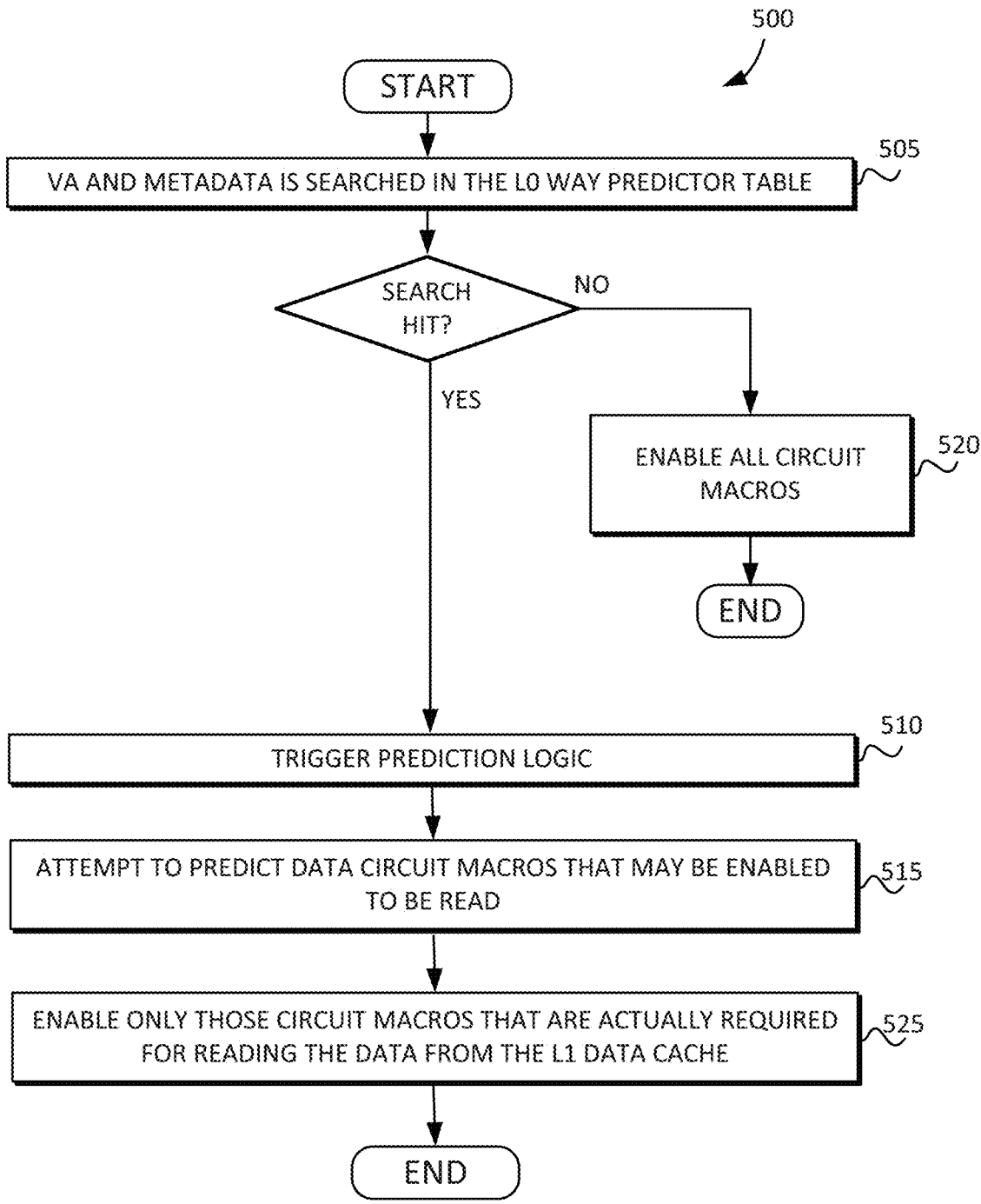
FIG. 5 is a flow diagram illustrating a technique for performing a prediction and a cache read in accordance with some embodiments disclosed herein.

FIG. 5 is a flow diagram 500 illustrating a technique for performing a prediction and a cache read in accordance with some embodiments disclosed herein. Reference is now made to FIGS. 1 through 5.

Metadata and the virtual address associated with the load instruction may be used to search the L0 way table 115 as shown at 505. A successful search (e.g., a search hit) triggers prediction logic at 510. Subsequently, at 515, attempts may be made by the control logic 117 to predict the data circuit macros that may be enabled to read the required data from the L1 data cache 110. Power is saved by only enabling those circuit macros that are actually required for reading the data as shown at 525. The number of levels of logic in the prediction path may be reduced.

In addition, the size of the L0 way table 115 and associated control logic 117 is much smaller than the TLB 118 and cache tags 140. This allows the L0 way table 115 to physically reside much closer to the L1 data cache 110, thereby cutting down signal routing delays. A combination of reduced signal delays and fewer logic gates allows the cache circuit macros to be fired much earlier than what would have been possible using a traditional approach. This has a direct positive impact on the clock period and frequency at which the CPU 135 can operate.

It is possible the search in the L0 way table 115 results in a miss. In such a case all circuit macros may be enabled at 520. This is not a problem since the load address is also used to look up the TLB 118 and cache tags 140 in parallel. In the subsequent clock cycle, data may be read out from all of the circuit macros and a result of the lookup of tags 140 may be used to select data from one of the circuit macros. The TLB 118 and cache tags 140 need not be used to fire the cache circuit macro and may only be used to select the data post-read from the L1 data cache 110. This is advantageous as it allows this element of the pipeline of the CPU 135 to be staged over multiple cycles.

Predictor Table Organization and Refresh

Figure 6:
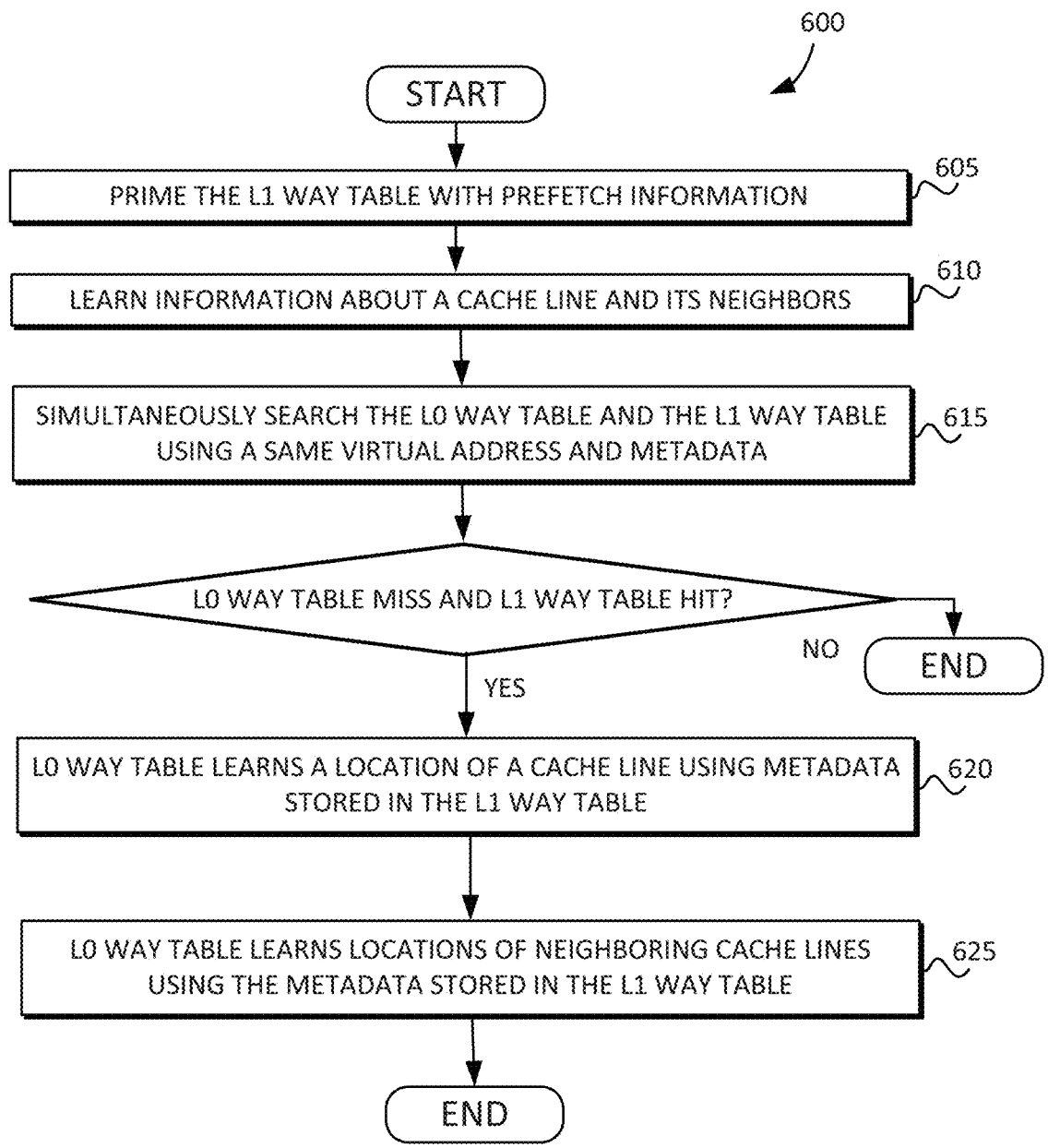
FIG. 6 is a flow diagram illustrating a technique for priming the L1 way table and refreshing the L0 way table in accordance with some embodiments disclosed herein.

FIG. 6 is a flow diagram 600 illustrating a technique for priming the L1 way table 120 and refreshing the L0 way table 115 in accordance with some embodiments disclosed herein. Reference is now made to FIGS. 1 through 6.

Embodiments disclosed herein leverage the spatial locality of cache accesses to optimize metadata storage in the way predictor tables (e.g., L0 way table 115 and L1 way table 120). An inference can be made that it is very likely that a cache line access is to be followed by a subsequent cache line access whose address is very similar to the first. This allows the way predictor tables to share the metadata for multiple cache lines and reduce the area footprint. In addition, due to this organization the way predictor tables are able to be trained for groups of cache lines.

For example, the L0 way table 115 may be sized to be small to be timing and power-friendly. Due to its small size, the L0 way table 115 may only predict locations of a limited set of cache lines. Prefetches and other speculative data read accesses need not be used to train the L0 way table 115. This reduces superfluous information in the L0 way table 115. When the way predictor table fails to make a prediction, multiple circuit macros may be fired. This has a power impact and embodiments disclosed herein include a technique for avoiding this problem.

A secondary structure called the L1 way table 120 may be maintained with the purpose of mitigating the above mentioned problem. The L1 way table 120 need not be searched before reading the L1 data cache 110. Since the L1 way table 120 may be located away from the cache critical paths, the L1 way table 120 may be sized to be larger than the L0 way table 115, and can track a wider set of cache lines. The L1 way table 120 may be organized and trained in a similar fashion as the L0 way table 115. Moreover, in contrast with the L0 way table 115, hardware prefetch engines may be used to train the L1 way table 120.

Load addresses that display spatial locality in general are very amenable to hardware prefetching. By using the prefetches to prime the L1 way table 120 as shown at 605, the control logic 121 of the L1 way table 120 gets a head start on training, and is able to learn the cache line locations well before an actual load instruction is encountered. The location of a cache line and its spatial neighbors can be learned using the cache prefetches as shown at 610. Organization of the L1 way table 120 allows information associated with a cache line and its neighbors to be stored together. This facilitates the making of predictions as explained below.

Put differently, a number of workloads have prefetchable patterns and the L0 data cache 110 prefetchers do a reasonable job of prefetching the demand addresses. Since the prefetches issue well before demand addresses, the hardware leverages this to get a jump-start on learning the way associated with the demand cache line address. This learned information may be stored in the L1 way table 120. Eventually when a demand encounters a miss in the L0 way table 115 (e.g., due to the L0 way table 115 having limited capacity), the information learned for the demand cache line as well as adjoining cache lines may be promoted to the L0 way table 115 from the L1 way table 120. Accordingly, when there is locality of accesses the power penalty of a predictor miss is paid for only by one cache line in a group of cache lines.

When a load is inspected prior to the cache read, both the L0 way table 115 and the L1 way table 120 may be searched simultaneously as shown at 615. In some embodiments, the L0 way table 115 and the L1 way table 120 may be searched simultaneously using a same virtual address and metadata. A miss in the L0 way table 115 but a hit in the L1 way table 120 may cause the location of cache line to be learned in the L0 way table 115 using the metadata stored in the L1 way table 120 as shown at 620. In addition, the location of neighboring cache lines may also be learned and stored simultaneously in the L0 way table 115 as shown at 625. In this manner, the L0 way table 115 is opportunistically refreshed using information stored in the larger L1 way table 120. At the end of this refresh operation, the L0 way table 115 may contain the locations of a group of cache lines that are spatial neighbors. This look-ahead training is advantageous particularly when programs exhibit spatial locality. A single load miss can trigger this operation, thereby allowing a significant number of subsequent load operations to predict accurately, hence reducing the number of circuit macros being fired and allowing for power savings.

Cache Conflict Reduction and Resolution

Data caches are often organized into sub-partitions with each sub-partition having multiple circuit macros. The sub-partitions are referred to as banks (e.g., 175) and ways (e.g., 180). The banks 175 may be determined using a few bits of the virtual address provided by the load instruction. Determining the ways 180 is more complicated and requires looking up the TLB 118 and the cache tags 140. In traditional approaches, determining the circuit macro to read requires knowing the bank 175 as well as the way 180.

The circuit macros are generally built using a single read port for area efficiency reasons. Multiple load instructions can try to access the L1 data cache 110 in the same clock cycle. If they happen to access the same circuit macro then this can cause one of the load instructions to have to wait and retry its read at a later time.

One of the ways to solve this problem is to check the bank 175 and way 180 being accessed by the individual load operations and see if there is a conflict. On a conflict, a decision may be taken to prioritize one of the memory read operations. But determining the way 180 is a relatively complex task and takes a significant portion of a clock period making it hard or even impossible to allow such prioritization of read operations. Such designs often ignore the way 180 and just check to see if the load operations are accessing the same bank 175, which can cause false conflicts and extra replays of read operations, which in turn has a detrimental performance impact.

In some embodiments disclosed herein, the way predictor tables learn, store, and provide the predicted cache line locations to check for conflicts. Because the prediction can be done much faster than a traditional tag lookup, conflict checks can be enhanced to include both information about the bank 175 as well as the way 180. This allows for more accurate arbitration of read operations, thereby improving the performance of the CPU 135.

In general, circuit macros of the L1 data cache 110 may support only one read per cycle. Multiple load pipes in a CPU 135 can cause the load throughput to increase. This can increase the possibility that multiple reads want to access the same macro. Load operations on a first pipe of the CPU 135 may be given priority over load operations on a second pipe thereof. In case of contending access from the different CPU pipes to the same circuit macro, the load operation on the second CPU pipe may be forced to replay, thereby adding to the effective load-to-use latency of the load. This has performance implications.

Every circuit macro can be addressed from either a load operation on the first CPU pipe or the second CPU pipe. If a circuit macro needs to be addressed by a load operation on the first CPU pipe, then its address may be favored over the second CPU pipe. To fire the circuit macro correctly, an indication may be used whether the load operation on the first CPU pipe is going to access the circuit macro. One way to compute this indication is to know which bank 175 and way 180 in the L1 data cache 110 is to be accessed by the load operation on the first CPU pipe. The cache line way 180 must be known early to select between the first load operation or the second load operation, while addressing individual circuit macros. Using the L1 cache tags 140 is not feasible from a timing standpoint, and only worsens with cache growth. As a solution, the L0 way table 115 may predict the way 180 and bank 175 for address selection. This removes the need for being overly conservative in determining read conflicts on the L1 data cache 110.

Cache Circuit Macro Firing

Figure 7:
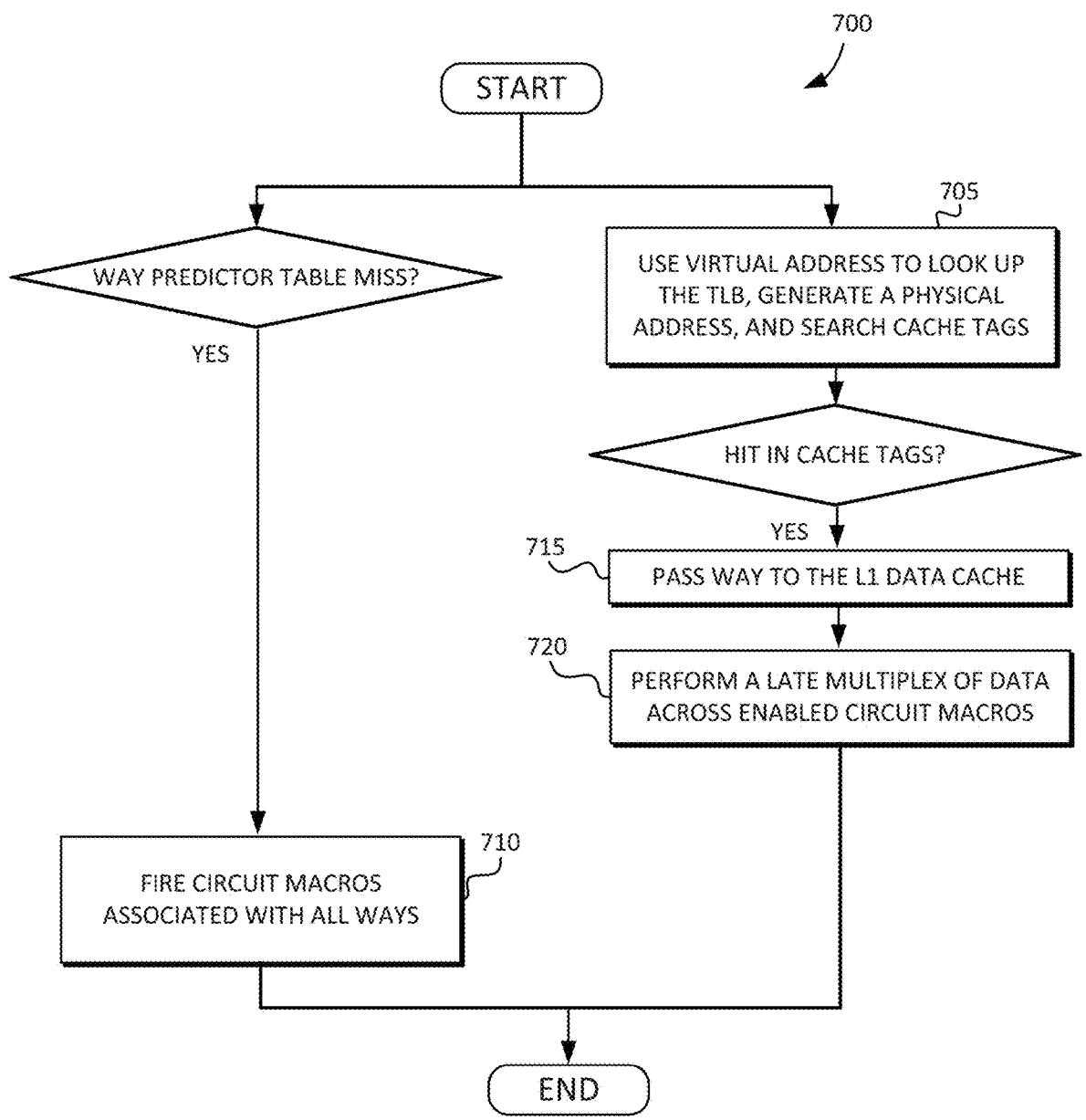
FIG. 7 is a flow diagram illustrating a technique for handling a way predictor table miss in accordance with some embodiments disclosed herein.

FIG. 7 is a flow diagram 700 illustrating a technique for handling a way predictor table miss in accordance with some embodiments disclosed herein. Reference is now made to FIGS. 1 through 7.

In the case of a miss in the L0 way predictor table 115, circuit macros associated with all ways 180 are fired as shown at 710. More specifically, when a load operation cannot index into a row of the L0 way table 115, then all ways 180 within a bank 175 of the L1 data cache 110 are fired. As a result, any associated circuit macros of the L1 data cache 110 are enabled, allowing the data to be read.

Simultaneously, at 705, a virtual address may be used to lookup the TLB 118, generate the physical address, and search the L1 cache tags 140. When a load operation is found to be a hit in the cache tags 140, then the way 180 obtained here is passed onto the L1 data cache 110 as shown at 715. The way 180 may be used to perform a late multiplex out of the data across all of the enabled circuit macros as shown at 720. Since the "hit-way" from a traditional tag lookup is only used for the late "way-select" as shown at 705, 715, and 720, it is a relatively less challenging speed-path.

Figure 8:
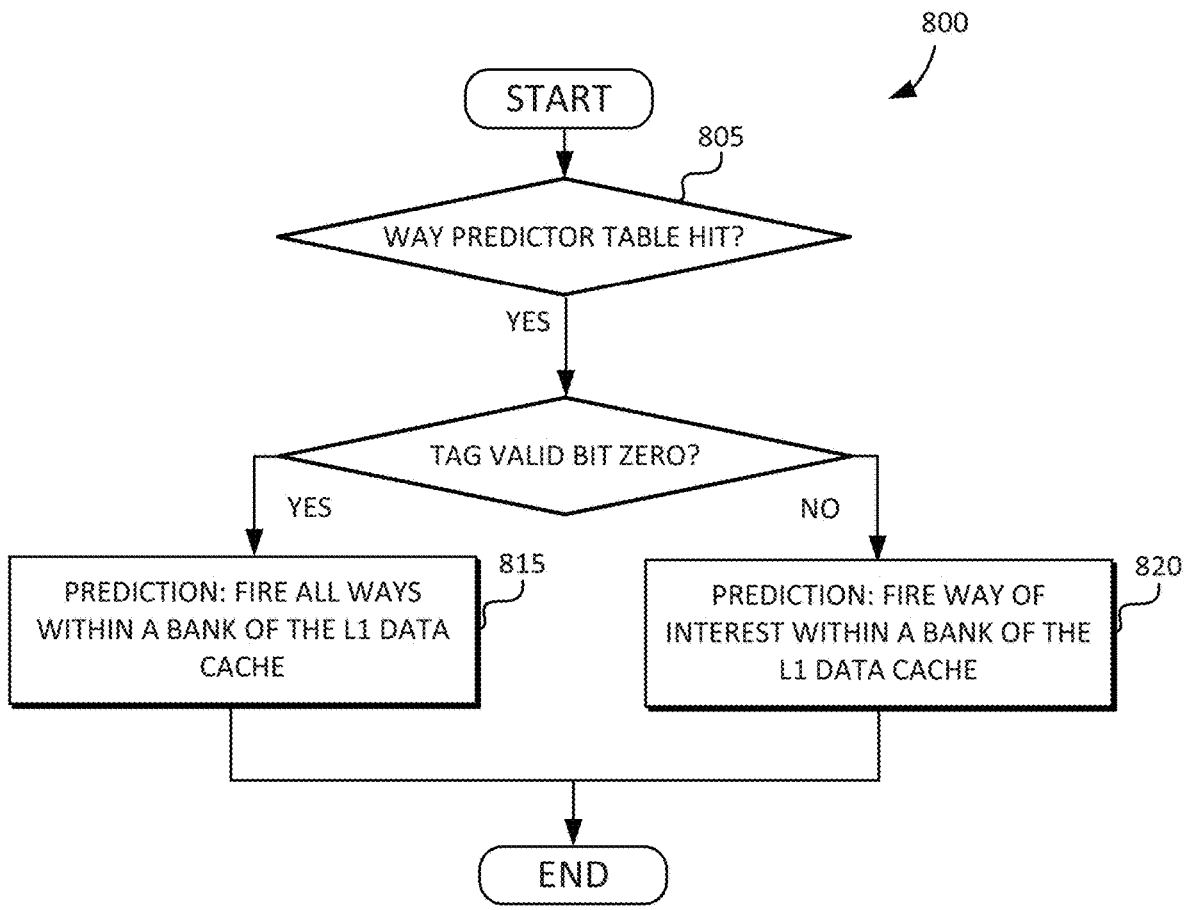
FIG. 8 is a flow diagram illustrating a technique for handling a way predictor table hit in accordance with some embodiments disclosed herein.

FIG. 8 is a flow diagram 800 illustrating a technique for handling a way predictor table hit in accordance with some embodiments disclosed herein. Reference is now made to FIGS. 1 through 8.

When a load instruction can index into a row and column of the L0 way table 115 (i.e., a way predictor table hit as shown at 805), but the tag valid bit (e.g., 320) of the corresponding cache line is zero (i.e., the cache line has not been visited even once), then at 815, the prediction is made to fire all ways 180 within a bank 175 of the L1 data cache 110. Consider the case where the location of the cache line has been evicted out of all way predictor tables. When the cache line is accessed again, a conservative inference can be made that the cache line exists in the L1 data cache 110, and accordingly, the prediction is fire all ways 180. Data is still read by using the actual way 180 coming out of the cache tags 140, similar to the above case.

Conversely, when a load instruction can index into a row and column of the L0 way table 115 (i.e., a way predictor table hit as shown at 805), and the tag valid bit (e.g., 320) of the corresponding cache line is set to one (i.e., the cache line has been visited at least once), then the way 180 pointed to by that location in the way predictor table may be used to fire the corresponding single circuit macro, as shown at 820. In some embodiments, an early read enable pin (not shown) on the physical circuit macro may be used in such cases, thereby saving power.

It will be understood that in an alternative embodiment, the tag valid bit being set to one can cause a prediction to fire all ways within the bank of the L1 data cache 110, and the tag valid bit being set to zero can cause a prediction to fire the way of interest within the bank of the L1 data cache. In other words, the tag valid bit can be used as a flag, and it need not matter which value of the flag (0 or 1) causes the corresponding behavior—only that there are two outcomes depending on the flag. This concept of the flag being either a zero or a one is also applicable to the cache line valid bits 325.

In some embodiments, read access for "zero-data lines" in the L1 data cache 110 are shut off by tagging such lines in the L0 way predictor table 115. Put differently, power consumed by the L1 data cache 110 may be reduced by shutting off cache read access for cache lines in which all bytes of data are "0" by marking such cache lines in the L0 way predictor table 115, and using the L0 way predictor table 115 to predict the data (i.e., "0s") associated with the load instructions referencing those cache lines.

Figure 9:
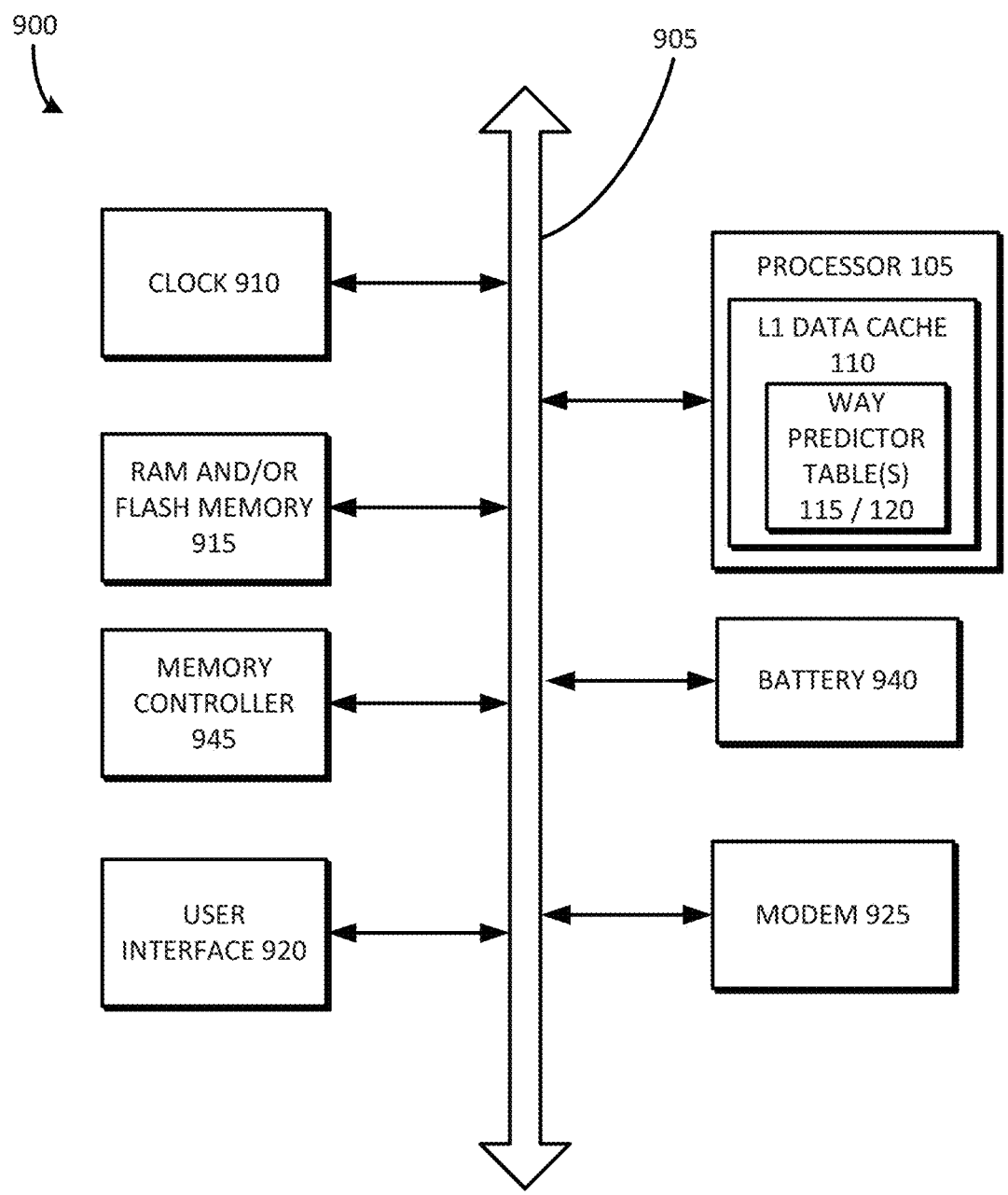
FIG. 9 is an example block diagram of a computing system including a processor having an L1 data cache and way predictor tables according to embodiments of the inventive concept as disclosed herein.

FIG. 9 is an example block diagram of a computing system 900 including a processor 105 having an L1 data cache 110 and way predictor tables (e.g., 115 and 120) according to embodiments of the inventive concept as disclosed herein.

The processor 105 may include the L1 data cache 110 and the way predictor tables 115 and/or 120. The processor 105 may be electrically connected to a system bus 905. The computing system 900 may also include a clock 910, a random access memory (RAM) and/or flash memory 915, a memory controller 945, a user interface 920, and/or a modem 925 such as a baseband chipset, any or all of which may be electrically coupled to the system bus 905.

If the computing system 900 is a mobile device, it may further include a battery 940, which powers the computing system 900. Although not shown in FIG. 9, the computing system 900 may further include an application chipset, a camera image processor (CIS), a mobile DRAM, and the like. The memory controller 945 and the flash memory 915 may constitute a solid state drive/disk (SSD), which uses a nonvolatile memory to store data.

In example embodiments, the computing system 900 may be used as computer, portable computer, Ultra Mobile PC (UMPC), workstation, net-book, PDA, web tablet, wireless phone, mobile phone, smart phone, e-book, PMP (portable multimedia player), digital camera, digital audio recorder/player, digital picture/video recorder/player, portable game machine, navigation system, black box, 3-dimensional television, a device capable of transmitting and receiving information at a wireless circumstance, one of various electronic devices constituting home network, one of various electronic devices constituting computer network, one of various electronic devices constituting a telematics network, RFID, or one of various electronic devices constituting a computing system.

The various operations of methods described above may be performed by any suitable means capable of performing the operations, such as various hardware and/or software component(s), circuits, and/or module(s).

Some embodiments include a computer-implemented method for high-frequency and low-power level 1 (L1) cache access. The method may include inspecting an L1 data cache load instruction. The method may include indexing into a row of a way predictor table using metadata and/or the virtual address associated with the load instruction. The method may include indexing into a column of the way predictor table using at least a portion of the virtual address. The method may include matching information stored at the row and the column of the way predictor table to a location of a cache line. The method may include predicting the location of the cache line within the L1 data cache based on the information match.

The method may include, responsive to the information match, enabling only a circuit macro of the L1 data cache that corresponds to the cache line. The method may include, responsive to the information match, determining whether a tag valid bit associated with the row and the column of the way predictor table is asserted. The method may include, responsive to determining that the tag valid bit is not asserted, firing all ways within a bank of the L1 data cache. The method may include, responsive to the information match, determining whether a tag valid bit associated with the row and the column of the way predictor table is asserted. The method may include, responsive to determining that the tag valid bit is asserted, firing only a particular way within a bank of the L1 data cache.

In some embodiments, the method may include not finding a first index into the row of the way predictor table. The method may include not finding a second index into the column of the way predictor table. The method may include not matching the information stored at the row and the column of the way predictor table to the location of the cache line. The method may include enabling all circuit macros within a bank of the L1 data cache based on a lack of the information match.

In some embodiments, simultaneous to not finding the first index and the second index into the way predictor table, the method may include: using the virtual address to look up a translation lookaside buffer (TLB), generating a physical address, searching cache tags of the L1 data cache, passing a selected way to the L1 data cache, and performing a late multiplex of data across enabled circuit macros of the L1 data cache.

The method may include priming a second larger level 1 (L1) way predictor table with prefetch information. The method may include refreshing the first L0 way predictor table using information stored in the L1 way predictor table.

The method may include learning information about a cache line and at least one neighboring cache line of the cache line. The method may include simultaneously searching the first L0 way predictor table and the second L1 way predictor table. The method may include determining that the simultaneous searching resulted in a miss in the first L0 way predictor table and a hit in the second L1 way predictor table. The method may include, responsive to the determining, storing a location of a cache line in the first L0 way predictor table using metadata stored in the second L1 way predictor table.

The method may include, responsive to the determining, storing a location of at least one neighboring cache line in the first L0 way predictor table using the metadata stored in the second L1 way predictor table.

Some embodiments may include a computer-implemented method for high-frequency and low-power level 1 (L1) cache access, comprising inspecting a virtual address of an L1 data cache load instruction. The method may include searching a way predictor table using the virtual address and metadata. The method may include simultaneously with the searching, looking up a translation lookaside buffer (TLB) and cache tags of the L1 data cache.

The method may include attempting a match to a cache line of the L1 data cache using metadata stored in the way predictor table. The method may include, responsive to succeeding in the match, predicting a location of the cache line using the metadata stored in the way predictor table. The method may include, responsive to not succeeding in the match, allocating a new entry in the way predictor table. The method may include generating second metadata to enable a prediction of the location of the cache line. The method may include writing the second metadata into the new entry in the way predictor table.

Some embodiments include a computer-implemented method for accelerating predictor training in a level 1 (L1) cache. The method may include priming metadata of a level 1 (L1) way predictor table with information learned using hardware prefetches prior to a load instruction. The method may include detecting a miss in a level 0 (L0) way predictor table and a hit in the L1 way predictor table. The method may include refreshing the L0 way predictor table using metadata stored in the L1 way predictor table. In some embodiments, refreshing includes learning and storing one or more locations of a group of cache lines using the metadata stored in the L1 way predictor table.

Embodiments may include a computer-implemented method for improving performance of a cache. The method may include reducing performance impact of cache read conflicts by detecting that a plurality of load instructions are attempting to access the cache in a same clock cycle, wherein detecting includes checking a bank and a way of each of the plurality of load instructions to determine a potential conflict between the plurality of load instructions. The method may include, responsive to detecting the potential conflict, prioritizing a particular load instruction from among the plurality of load instructions over another load instruction from among the plurality of load instructions dependent on the bank and the way of each of the plurality of load instructions.

The method may include marking a level 0 (L0) way predictor table with one or more indicators that a plurality of cache lines associated with the cache store all "0s". The method may include reducing power consumption of the cache by shutting off cache read access for the plurality of cache lines associated with the cache using the L0 way predictor table.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The following discussion is intended to provide a brief, general description of a suitable machine or machines in which certain aspects of the inventive concept can be implemented. Typically, the machine or machines include a system bus to which is attached processors, memory, e.g., RAM, ROM, or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the inventive concept may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

What is claimed is:

1. A computer-implemented method for high-frequency and low-power level 1 (L1) cache access, the method comprising:
   inspecting a virtual address of an L1 data cache load instruction;
   indexing into a row of a way predictor table using metadata and the virtual address associated with the load instruction;
   indexing into a column of the way predictor table using the virtual address;
   matching information stored at the row and the column of the way predictor table to a location of a cache line; and
   predicting the location of the cache line within the L1 data cache based on the information match.

2. The computer-implemented method of claim 1, further comprising:
   responsive to the information match, enabling only a circuit macro of the L1 data cache that corresponds to the cache line.

3. The computer-implemented method of claim 1, further comprising:
   responsive to the information match, determining whether a tag valid bit associated with the row and the column of the way predictor table is asserted; and
   responsive to determining that the tag valid bit is not asserted, firing all ways within a bank of the L1 data cache.

4. The computer-implemented method of claim 1, further comprising:
   responsive to the information match, determining whether a tag valid bit associated with the row and the column of the way predictor table is asserted; and
   responsive to determining that the tag valid bit is asserted, firing only a particular way within a bank of the L1 data cache.

5. The computer-implemented method of claim 1, further comprising:
   not finding a first index into the row of the way predictor table;
   not finding a second index into the column of the way predictor table;
   not matching the information stored at the row and the column of the way predictor table to the location of the cache line; and
   enabling all circuit macros within a bank of the L1 data cache based on a lack of the information match.

6. The computer-implemented method of claim 5, further comprising:
   simultaneous to not finding the first index and the second index into the way predictor table:
   using the virtual address to look up a translation lookaside buffer (TLB);
   generating a physical address;
   searching cache tags of the L1 data cache;
   passing a selected way to the L1 data cache; and
   performing a late multiplex of data across enabled circuit macros of the L1 data cache.

7. The computer-implemented method of claim 1, wherein the way predictor table is a first level 0 (L0) way predictor table, the method further comprising:
   priming a second larger level 1 (L1) way predictor table with information learned using hardware prefetches in addition to the load instruction; and refreshing the first L0 way predictor table using information stored in the L1 way predictor table.

8. The computer-implemented method of claim 7, further comprising:
learning information about a cache line and at least one neighboring cache line of the cache line; and
simultaneously searching the first L0 way predictor table and the second L1 way predictor using the metadata and the virtual address associated with the load instruction.

9. The computer-implemented method of claim 8, further comprising:
determining that the simultaneous searching resulted in a miss in the first L0 way predictor table and a hit in the second L1 way predictor table; and
responsive to the determining, storing a location of a cache line in the first L0 way predictor table using metadata stored in the second L1 way predictor table.

10. The computer-implemented method of claim 9, further comprising:
responsive to the determining, storing a location of at least one neighboring cache line in the first L0 way predictor table using the metadata stored in the second L1 way predictor table.

11. A computer-implemented method for high-frequency and low-power level 1 (L1) cache access, the method comprising:
inspecting a virtual address of an L1 data cache load instruction;
searching a way predictor table using the metadata and the virtual address associated with the load instruction; and
simultaneously with the searching, looking up a translation lookaside buffer (TLB) and cache tags of the L1 data cache.

12. The computer-implemented method of claim 11, further comprising:
attempting a match to a cache line of the L1 data cache using metadata stored in the way predictor table.

13. The computer-implemented method of claim 12, further comprising:
responsive to succeeding in the match, predicting a location of the cache line using the metadata stored in the way predictor table.

14. The computer-implemented method of claim 12, wherein the metadata is first metadata, the method further comprising:
responsive to not succeeding in the match, allocating a new entry in the way predictor table; and
generating second metadata to enable a prediction of the location of the cache line.

15. The computer-implemented method of claim 14, further comprising:
writing the second metadata into the new entry in the way predictor table.

16. A computer-implemented method for accelerating predictor training in a level 1 (L1) cache, the method comprising:
priming metadata of a level 1 (L1) way predictor table with information learned using hardware prefetches prior to a load instruction;
detecting a miss in a level 0 (L0) way predictor table and a hit in the L1 way predictor table; and
refreshing the L0 way predictor table using metadata stored in the L1 way predictor table,
wherein refreshing includes learning and storing one or more locations of a group of cache lines using the metadata stored in the L1 way predictor table.

17. The computer-implemented method of claim 16, further comprising: marking a level 0 (L0) way predictor table with one or more indicators that a plurality of cache lines associated with the cache store all "0s"; and reducing power consumption of the cache by shutting off cache read access for the plurality of cache lines associated with the cache using the L0 way predictor table.

* * * * *